Jan. 5, 1960 T. H. SCHULTZ 2,919,989
SOLID FLAVORING COMPOSITION AND METHOD OF PRODUCING THE SAME
Filed March 5, 1958

Thomas H. Schultz
INVENTOR.

BY
R. Hoffman
Attorney

2,919,989

SOLID FLAVORING COMPOSITION AND METHOD OF PRODUCING THE SAME

Thomas H. Schultz, Lafayette, Calif., assignor to the United States of America as represented by the Secretary of Agriculture Application March 5, 1958, Serial No. 719,458

3 Claims. (Cl. 99—140)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel flavoring compositions and methods for producing them. A general object of the invention concerns the preparation of solid flavoring compositions which serve as convenient sources of flavor and in which the volatile flavoring principles in the composition are effectively "locked-in," that is, the flavoring principles are completely surrounded by an edible, solid, amorphous, impermeable, protective substance whereby the composition may be stored for long periods of time without loss of flavoring value through vaporization or deterioration of the flavoring principles. A specific object of the invention concerns the preparation of flavoring compositions having the above mentioned properties and wherein the protective substance, or carrier base, contains particular ingredients which cooperate (a) to ensure that the composition is in an amorphous state hence has maximum ability to protect the volatile flavorings incorporated therein and (b) to facilitate production of the composition by providing desirable properties to the composition in the preparative stages. Further objects and advantages of the invention will be evident from the description herein taken in connection with the annexed drawing.

Figure 1:
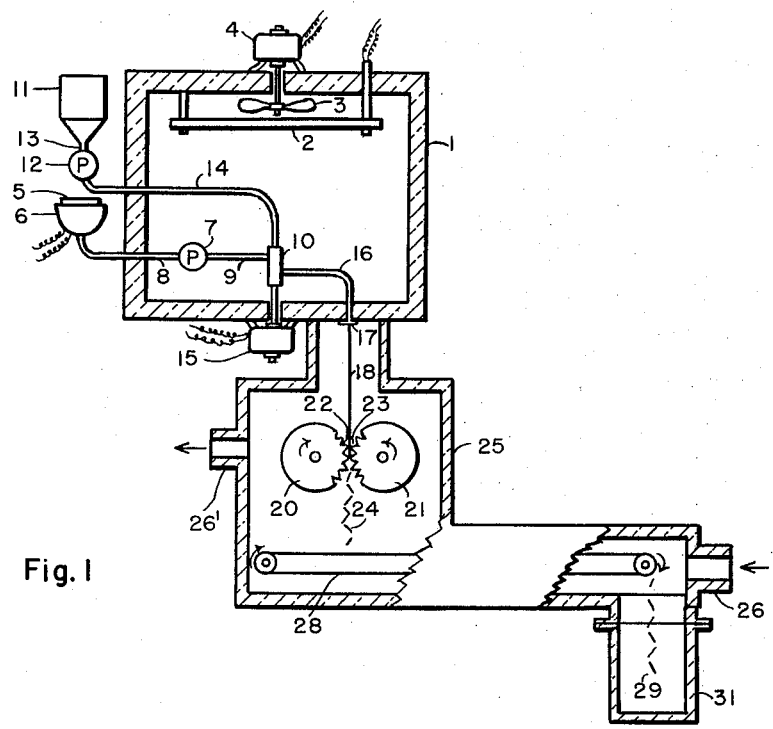
Fig. 1 is an elevation, partly in cross-section, of one modification of apparatus for producing the novel compositions of this invention.

It has been proposed heretofore to prepare solid flavoring compositions by emulsifying a volatile flavoring agent into a molten sugar base and cooling the hot emulsion to solidify it. In the copending patent application of Thomas H. Schultz, Serial No. 646,943, filed March 18, 1957, now Patent No. 2,856,291, granted October 14, 1958, there is described and claimed a method for preparing such compositions in the form of rod-like particles. The method of said application is essentially as follows: Into a suitable mixing device, such as a colloid mill, provided with heating means is continuously pumped pre-determined amounts of orange oil, or other volatile flavoring agent, and the sugar base, the latter generally being sucrose with a minor amount of corn syrup and water. The hot emulsion flows from the mixer to an orifice whereby the hot emulsion is extruded into the atmosphere in the form of a continuous stream of narrow cross-section. The stream is then permitted to cool sufficiently to attain a plastic condition and is then subdivided into rod-like pieces by applying a cutting or pinching action. These pieces are cooled, collected and constitute the product—the solid flavoring composition in which the volatile flavoring material is locked-in against vaporization and deterioration.

It has been observed that in the practice of the above-described process undesired results are obtained under certain circumstances. For example the hot emulsion of flavoring oil and sugar base may crystallize in the mixing device or after cooling. (It is of course essential to maintain the composition in an amorphous state to lock in the flavor.) Another problem is that at times the extrusion is not satisfactory in that the extruded stream is of non-uniform cross-section alternating in areas of large diameter and thread-like diameter.

It has now been found that when a base containing certain components is employed the above defects are obviated and consistently good results are obtained. The base in accordance with the invention contains essentially the following ingredients on a dry basis:

| Ingredient: | Proportion, percent of total weight |
|---|---|
| Sucrose | 15 to 40 |
| Lactose | 10 to 15 |
| Maltose | 15 to 40 |
| Dextrose | 10 to 50 |
| Dextrin | 0 to 15 |

The several ingredients of the base cooperate with one another to provide these desirable attributes:

(1) The base does not crystallize while hot in the equipment (pump, mixer, or extruder) nor when cooled to solidify it. The solidified cooled product retains its amorphous state even when exposed to moist air. The ability of the molten base to refrain from developing crystals when subjected to shearing stresses in the mixer or other equipment is an especially noteworthy characteristic of the base since such stresses are notorious for their ability to cause crystal formation in many substrates.

(2) The base has the proper characteristics, as regards melting temperature and viscosity, to facilitate incorporation of the flavoring agent, to obtain extrusion in the form of a stream of uniform cross-section, and to obtain rapid setting of the extruded material to produce a hard, non-sticky, amorphous product. These advantages are further explained as follows: The base of the invention liquefies at temperatures which are low enough so that the flavoring agent may be incorporated therein without decomposition of either the flavoring agent or the base itself. At the same time in the liquefied state the base exhibits a proper viscosity for extrusion so that by forcing the molten material through an orifice a stream of uniform cross-section can be readily obtained. Moreover, the base exhibits a high temperature coefficient of viscosity, meaning that the viscosity increases sharply with decreasing temperature. The advantage of this attribute is that when the extruded stream of hot material is contacted with air or other cooling medium it rapidly increases in viscosity to such an extent as to form a hard, glassy, non-sticky, amorphous mass. Thereby a free-flowing particulate product is readily obtained with no danger of the particles adhering to one another.

In preparing the base, it is generally preferred to employ corn syrup (or corn syrup solids) as the source of some of the ingredients particularly maltose, dextrose, and dextrin. Depending on the type of corn syrup used these ingredients may be supplied in the proper proportions so that the individual components need not be added as such. Thus for example maltose is preferably supplied as corn syrup of the high-maltose type. This grade of corn syrup is to be differentiated from the common corn syrup of commerce which is a high-dextrose product containing a lesser amount of maltose than dextrose. Use of the high-maltose syrup (or the solids derived therefrom) eliminates any need for using isolated maltose which is quite expensive. Where a corn syrup (or corn syrup solids) is used to supply some of the ingredients, a small proportion of higher sugars will be added via the corn syrup. These higher sugars are not detrimental and their presence may even be advantageous in the carrier base.

Preparation of the solid flavoring compositions in accordance with the invention involves essentially these steps: Preparation of the molten carrier base, incorporation of the selected volatile flavoring agent into the base with the aid of agitation to obtain an emulsion of the flavoring agent in the molten base, and forming the emulsion into solid masses. In preparing the molten base the ingredients listed above may be mixed and heated to liquefy them. However to avoid any possibility of charring it is preferred to dissolve or disperse the ingredients in water and then boil the solution until it reaches a solids content high enough so that on cooling to room temperature it will form a hard glassy mass. In many cases when a boiling point of about 150° C. is attained the solids content is at the proper level. At this stage the composition contains at most 2 to 3% water. After having attained the proper solids content, the hot sugar base is preferably cooled somewhat so that when the flavoring agent is incorporated therein the amount of evaporation of the flavoring material will not be excessive and chemical deterioration of the flavoring material will not be appreciable. In any event the molten material may be cooled as much as desired with the proviso that it remain fluid enough to mix with the flavoring material and fluid enough to flow through the orifice or other equipment as may be used to form the solidified masses. Depending on the ingredients, the temperature of the molten base may be about from 80 to 150° C. when the flavoring agent is incorporated therein. Dextrin, for example, greatly increases the viscosity of the hot base. Thus where no dextrin or at most a small percentage thereof is used the base will remain fluid enough to incorporate the flavoring at lower temperatures than in instances where larger percentages of dextrin are employed. For best results, the flavoring agent is incorporated into the molten base without at the same time beating air into the mixture.

Any desired volatile flavoring agent may be incorporated in the carrier base in accordance with the invention. Illustrative examples are orange oil, lemon oil, grapefruit oil, lime oil, clove oil, peppermint oil, bay oil, cedarwood oil, apple essence, pear essence, pineapple essence, grape essence, peach essence, apricot essence, strawberry essence, raspberry essence, cherry essence, prune essence, plum essence, cinnamon oil, oil of nutmeg, oil of sage, oil of bitter almonds, cassia oil, tea-seed oil, coffee essence, and so forth. Mixtures of flavoring agents may of course be employed. In the case of fruit essences, such as those enumerated above, it is preferred to first purify them to remove water and low-molecular weight alcohols by the process described in the patent application of K. P. Dimick and B. Makower, Serial No. 368,016, filed July 14, 1953, now Patent No. 2,904,440, granted September 15, 1959. An edible oil and/or an edible emulsifying agent may be added to the purified fruit essence so that it will emulsify properly with the molten sugar base. Instead of, or together with, natural flavoring principles, synthetic flavoring agents may be employed. Illustrative examples are the edible flavor and aroma bearing aldehydes, alcohols, esters, ketones, phenols, and lactones, for instance, methyl anthranilate, decanal, nonanal, undecanal, cinnamic aldehyde, geraniol, menthol, methyl salicylate, phenylethyl alcohol, diacetyl, citronellol, citral, and so forth. The proportion of flavoring agent to be incorporated in the carrier base may be varied depending on the flavor strength desired in the final product. Usually enough of the flavoring agent is added to furnish about from 5 to 25% thereof in the emulsion.

The hot emulsion of flavoring agent and molten base produced as described above may then be treated in various ways to produce the solid composition. For example, the hot emulsion may be simply allowed to cool and solidify, then crushed or ground into particles of suitable size. However, since crushing or grinding generally involves loss of volatile flavoring material, it is preferred to produce the solid particles without applying attrition to the solidified composition but by reducing the emulsion into particles while still liquid or at least plastic. This can be done in various ways as by forming the hot emulsion into droplets which are allowed to congeal in air or by extruding the hot emulsion in a continuous stream which is subdivided by pinching or cutting action while still in plastic state. Application of this technique is explained below in further detail. The procedure of applying dividing action to the emulsion while it is still in a liquid to plastic state has the further advantage that the particles are especially free-flowing and free from any tendency to bridge or interlock. Moreover, this technique makes it possible to prepare particles of uniform size free from fines. In contrast, where the solidified emulsion is ground or crushed, fines are invariably produced and generally these are low in flavor and must be discarded. Also by applying dividing action to the emulsion while it is in a liquid to plastic state, the particles exhibit a dense, non-porous surface whch is especially well adapted to protect the flavoring agent from vaporization and deterioration. It is noted however that regardless of what technique is used to obtain the solidified particles, using the carrier base of this invention will produce a product which is a solid emulsion of minute globules of volatile, liquid flavoring agent uniformly dispersed throughout a continuous phase of the solid, amorphous carrier base. The amorphous nature of the solidified base is a very important factor as thereby the particles of flavoring agent are effectively protected from contact with the atmosphere so that vaporization and deterioration cannot take place. Such desirable results could not be obtained were the base to be in a crystalline state—in such event the channels between crystals would provide avenues for escape of the flavoring agent or contact thereof with the atmosphere. An additional advantage of the globular, dispersed nature of the flavoring agent in the amorphous base is that when the composition is contacted with water as in preparation for ultimate use, the flavoring agent is released throughout the liquid mass as minute droplets suspended in the liquid. This means that the reconstituted juice or other liquid product has a natural appearance and a uniform flavor in all its parts.

A preferred method of producing the solid flavoring composition in the form of rod-like particles is described below.

An example of apparatus suitable for producing the products of this invention is depicted in Fig. 1 of the annexed drawing. Referring to this figure, the device includes a container 1 made of asbestos, glass fibers, or other insulating material. For maintaining the interior of container 1 at the desired temperature there is provided a series of electrical strip-heaters 2 and fan 3 driven by electrical motor 4. The fan 3 circulates air between heaters 2 (which are spaced from one another) and about the space within container 1.

The carrier base is held in hopper 5, surrounded by electrical heating mantle 6 which serves to keep the base at the desired temperature and degree of fluidity. The hot liquid base is forced by pump 7 into mixer 10 via tubes 8 and 9. Pump 7 is preferably equipped with a variable speed drive so that the rate of flow can be controlled.

The volatile flavoring agent (such as orange oil) is kept in hopper 11 and is forced by pump 12 into mixer 10 via tubes 13 and 14. Pump 12 is preferably provided with a variable speed drive so that the rate of flow of the oil can be regulated.

Within mixer 10, actuated by variable speed electric motor 15, the oil and molten base are intimately commingled to form a hot liquid emulsion, the base forming the continuous phase and the oil forming the dispersed phase. Mixer 10 may be, for example, a colloid mill.

The hot emulsion of oil and carrier base is forced through tube 16 into nozzle 17. The rate of flow and the internal diameter of nozzle 17 are so correlated that the emulsion issues from the nozzle as a continuous stream 18 of narrow cross-section. Usually, the orifice diameter is chosen such that the stream has a diameter of about 0.01 to about 0.10 inch.

Beneath container 1 is provided housing 25 through which cool dry air is circulated via aperture 26 and vent 26'. Within housing 25 are located rotating drums 20 and 21 equipped with teeth 22 and 23. To simplify the drawing, only a limited number of teeth are shown, in actuality teeth are provided about the entire circumference of each drum. Drums 20 and 21 are preferably hollow and provided with means for circulating a cooling medium, such as water, through them. The drums are rotated in opposite directions as depicted by the arrows but at the same speed. The speed of the drums is so regulated that the teeth 22, 23 have approximately the same peripheral speed as the speed at which thread 18 moves downwardly. This thread 18 in descending from nozzle 17 is cooled by the atmosphere existing in housing 25 to a plastic state and engagement of the teeth 22, 23 with the thread or stream 18 divides it into rods 24. It is to be noted that teeth 22, 23 do not mesh with one another but their points come opposite and touch one another at the instant when the teeth are in the plane passing through the axes of drums 20 and 21. Preferably, drums 20 and 21 are provided with means for adjusting the distance from one another whereby the degree of contact between teeth 22 and 23 can be adjusted to get proper subdivision of the stream 18 into rod-like elements. In general, the spacing of the teeth on the periphery of the drums is so chosen that the rods have a length of about 2 to 10 times their diameter.

It is also preferred that means be provided for adjusting the distance between nozzle 17 and drums 20, 21. By control of this distance one is assured that the stream 18 is cooled to a plastic state by the time it is engaged by teeth 22, 23. However, the distance should not be so great that the weight of stream 18 causes excessive stretching. A distance of about 3 inches is usually satisfactory.

Figure 2:
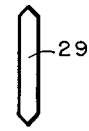
Fig. 2 is an elevation on a greatly enlarged scale of a rod-shaped particle of stabilized flavoring composition produced in accordance with this invention.

The rod-like elements 24 produced by the action of drums 20, 21 fall onto conveyor belt 28 which carries them through housing 25 whereby they are further cooled and hardened by contact with the cool dry air entering through aperture 26. The cooled hardened particles, now indicated by 29, are dropped off the belt and fall into vessel 31. The cool air forced into housing 25 is preferably in a dry state to prevent the rods 24 from getting tacky or assuming a crystalline state. It is obvious that the distance between drums 20, 21 and the top flight of belt 28 should be so selected that rods 24 are in a non-sticky state by the time they fall upon the belt. An enlarged view of the final product, 29, is shown in Fig. 2.

By the process described there is produced in particulate form a solid emulsion of minute globules of volatile, liquid flavoring agent uniformly dispersed throughout a continuous phase of a solid edible carrier base. The particles have a smooth, non-tacky, imperforate surface and are free from frangible formations; the texture of the particles is non-fragile, vitreous, hard, and strong. The particles en masse form a free-flowing pourable product without any tendency for interlocking individual particles. Moreover the particles are capable of withstanding without breakage the impact and abrasive stresses of packaging, dispersing, and shipping. The flavoring material is securely locked in the composition so it is stabilized and protected from vaporization and deterioration even when the particles are stored for long periods of time.

If desired the carrier base and flavoring oil may be formed into a hot emulsion in equipment other than described above. For example, a pre-formed hot emulsion may be directly pumped into nozzle 7 and subsequently processed as above described. It is preferred however to form the emulsion continuously and immediately prior to extrusion through the nozzle because when such is done loss of flavoring oil through vaporization and/or deterioration is minimized. Where a pre-formed hot emulsion is used, the oil is subjected to heat for a longer period of time and vaporization and deterioration are more likely to occur.

The invention is further illustrated by the following examples. Several compositions not within the scope of the invention are included for comparative purposes. In particular, compositions J (Ex. II) and D and G (Ex. III) are in this category.

Example I

The following ingredients were mixed together: sucrose, 50 g.; lactose, 20 g.; dextrose, 14 g.; corn syrup, 70 g.; water, 21 ml. The corn syrup was a high-maltose type syrup containing 81% solids, these solids being composed of: dextrose, 21.5%; maltose, 49.9%; higher sugars, 6.7%; dextrin, 21.9%. The mixture was boiled until its temperature rose to 150° C. The resulting base, after cooling to about 110° C., was ready for mixing with the volatile flavoring agent and forming into rod-like particles as previously described. The base had a viscosity at 120° C. of 22,000 centipoises (hereafter abbreviated as cp.) and a viscosity of 73,000 cp. at 110° C. It was observed that the base did not crystallize when subjected to shearing stresses in a colloid mill and when cooled formed an amorphous, hard, non-sticky product which did not crystallize on long standing.

The composition of this base expressed in percentages (dry weight basis) and accounting for the several ingredients in the corn syrup was: sucrose, 36%; lactose, 14%; dextrose, 19%; maltose, 20%; dextrin, 8.5%; higher sugars, 2.5%.

Example II

The ingredients listed in each of the following columns were mixed together and boiled until their temperature increased to 150° to prepare several different bases.

|  | Expt. J | Expt. M | Expt. N |
|---|---|---|---|
| Sucrose, g | 45 | 50 | 50 |
| Lactose, g | 45 | 20 | 20 |
| Dextrose, g | 20 | 22 | 18 |
| Corn syrup, g | 37.5 | 60 | 65 |
| Water, ml | 27.5 | 23 | 22 |

The corn syrup was the same as that described in Example I. The bases showed the following viscosities:

|  | Expt. J | Expt. M | Expt. N |
|---|---|---|---|
| Viscosity at 120° C., cp | 15,000 | 13,000 | 16,000 |
| Viscosity at 110° C., cp | 49,000 | 42,000 | 52,000 |

Samples of each of the bases were allowed to cool and solidify. It was found that bases M and N formed amorphous, hard, non-sticky solids which did not crystallize on standing. Base J formed a solid which crystallized on standing, this crystallinity being attributed to the high proportion of lactose in this formulation.

The composition of the three bases are expressed below in percentages (dry wt. basis) and accounting for the ingredients in the corn syrup:

|  | Expt. J | Expt. M | Expt. N |
|---|---|---|---|
| Sucrose, percent | 32 | 36 | 36 |
| Lactose, percent | 32 | 14 | 14 |
| Maltose, percent | 11 | 17 | 18.5 |
| Dextrose, percent | 19 | 23 | 21.0 |
| Dextrin, percent | 4.5 | 7.5 | 8 |
| Higher sugars, percent | 1.5 | 2.5 | 2.5 |

*Example III*

The ingredients listed in each of the following columns were mixed together and boiled until their temperature increased to 150° C. to prepare several different bases.

|  | Expt. D | Expt. E | Expt. F | Expt. G |
|---|---|---|---|---|
| Sucrose, g | 100 | 40 | 40 | 60 |
| Maltose, g | 0 | 42.1 | 42.1 | 0 |
| Lactose, g | 0 | 20 | 20 | 40 |
| Corn syrup, g | 50 | 50 | 0 | 50 |
| Dextrose, g | 0 | 0 | 40 | 0 |
| Water, ml | 25 | 25 | 35 | 25 |

The corn syrup in this case was a high dextrose equivalent syrup containing 80% solids, these solids being composed of: dextrose, 35%; maltose, 28%; higher sugars, 11%; dextrin, 26%.

The bases had the following viscosities:

|  | Expt. D | Expt. E | Expt. F | Expt. G |
|---|---|---|---|---|
| Viscosity at 120° C, cp | 18,000 | 42,000 | 7,000 | 41,000 |
| Viscosity at 110° C., cp |  |  | 18,000 |  |

The following observations were made: Base D was unsatisfactory as when the molten base was subjected to shear stresses between relatively-moving, closely-spaced surfaces it formed crystalline particles. Base G was unsatisfactory as it produced an amorphous solid on cooling but this solid developed crystallinity on standing. Bases E and F were satisfactory in that they did not develop crystallinity when subjected to shear stresses while molten and on cooling formed amorphous masses which did not develop crystallinity on standing.

The composition of the above four bases are expressed below in percentages (dry wt. basis) and accounting for the ingredients in the corn syrup:

|  | Expt. D | Expt. E | Expt. F | Expt. G |
|---|---|---|---|---|
| Sucrose, percent | 71.5 | 28.6 | 28.6 | 42.9 |
| Lactose, percent | 0 | 14.3 | 14.3 | 28.6 |
| Maltose, percent | 8.0 | 36.6 | 28.6 | 8.0 |
| Dextrose, percent | 10.0 | 10.0 | 28.6 | 10.0 |
| Dextrin, percent | 7.4 | 7.4 | 0 | 7.4 |
| Higher sugars, percent | 3.1 | 3.1 | 0 | 3.1 |

*Example IV*

The following ingredients were mixed together: sucrose, 50 g.; lactose, 20 g.; dextrose, 14 g.; corn syrup, 70 g.; water, 21 ml. The corn syrup was a high-maltose type syrup containing 81% solids, these solids being composed of: dextrose, 21.5%; maltose, 49.9%; higher sugars, 6.7%; dextrin, 21.9%. The mixture was boiled until its temperature rose to 150° C. The resulting base was cooled to 120° C. then 11 ml. of orange oil was added over a period of two minutes while continuously stirring. Stirring was continued about ½ minute longer and the melt was poured on an aluminum sheet and allowed to cool in an atmosphere of low humidity. The cool, solidified product was then ground in atmosphere of low humidity applying moderate pressures to minimize formation of fines. The product was screened to isolate the 10–20 mesh fraction. This screened fraction was held in a vacuum desiccator overnight to remove orange oil on the surface of the particles. The particles were amorphous, hard, and non-sticky and did not crystallize on long standing. The particles were admirably suited for restoration of flavor to dehydrated orange juice powder.

The composition of the sugar base used in this example is given below on a dry weight basis and accounting for the several ingredients in the corn syrup.

| Ingredient: | Percentage of total weight |
|---|---|
| Sucrose | 36 |
| Lactose | 14 |
| Maltose | 20 |
| Dextrose | 19 |
| Dextrin | 8.5 |
| Higher sugars | 2.5 |

Having thus described the invention, what is claimed is:

1. A solid emulsion of minute globules of a volatile, liquid flavoring agent uniformly dispersed throughout a continuous phase of a solid, amorphous carrier base, the base containing essentially the following ingredients:

|  | Proportion, Percent of total weight |
|---|---|
| Sucrose | 15 to 40 |
| Lactose | 10 to 15 |
| Maltose | 15 to 40 |
| Dextrose | 10 to 50 |
| Dextrin | 0 to 15 |

2. The process which comprises incorporating a volatile, liquid flavoring agent in a hot, molten carrier base, and cooling the hot mix to form a solid flavoring composition, the carrier base containing essentially the following ingredients:

|  | Proportion, Percent of total weight |
|---|---|
| Sucrose | 15 to 40 |
| Lactose | 10 to 15 |
| Maltose | 15 to 40 |
| Dextrose | 10 to 50 |
| Dextrin | 0 to 15 |

3. The process of claim 2 wherein the hot mix is formed into a stream of narrow cross-section and the stream while in plastic condition is subdivided into small rods.

References Cited in the file of this patent

UNITED STATES PATENTS

| 1,512,730 | Washington | Oct. 21, 1924 |
| 2,566,410 | Griffin | Sept. 4, 1951 |